United States Patent

[11] 3,623,779

| [72] | Inventor | Alfred Schmidt, Jr.<br>St. Blasien, Germany |
|---|---|---|
| [21] | Appl. No. | 876,314 |
| [22] | Filed | Nov. 13, 1969 |
| [45] | Patented | Nov. 30, 1971 |
| [73] | Assignee | Firma Ing. Alfred Schmidt<br>St. Blasien, Germany |
| [32] | Priority | Nov. 14, 1968 |
| [33] | | Germany |
| [31] | | P 18 08 902.6 |

[54] ENDLESS-CHAIN TRACKS FOR VEHICLES, SUCH AS SNOW REMOVAL VEHICLES AND THE LIKE
8 Claims, 7 Drawing Figs.

[52] U.S. Cl. .................................. 305/13, 305/54
[51] Int. Cl. ...................................... B62d 55/26
[50] Field of Search .......................... 305/12, 35, 36, 54

[56] References Cited
UNITED STATES PATENTS

| 1,970,099 | 8/1934 | Masury | 305/35 |
| 2,314,355 | 3/1943 | Knox | 305/35 X |
| 2,409,502 | 10/1946 | Leguillon | 305/35 |
| 3,047,342 | 7/1962 | Thompson | 305/54 X |

*Primary Examiner*—Richard J. Johnson
*Attorney*—Nolte and Nolte

ABSTRACT: The chain members of the endless-chain track comprise a baseplate which in the area of the snow accumulation and lump formation is provided with an opening covered by a hollow cleat. The cleat and the opening are filled with an adhesion-inhibiting material, such as rubber, plastics, and the like. The uppermost portion of the casing may support a projecting piece for improving the adhesion of the track to ground.

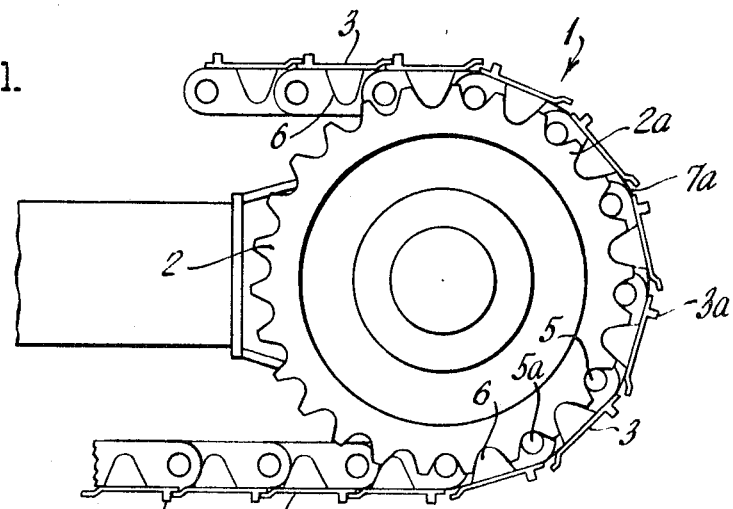
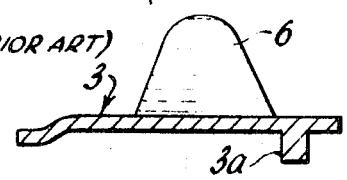
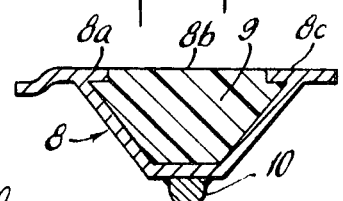
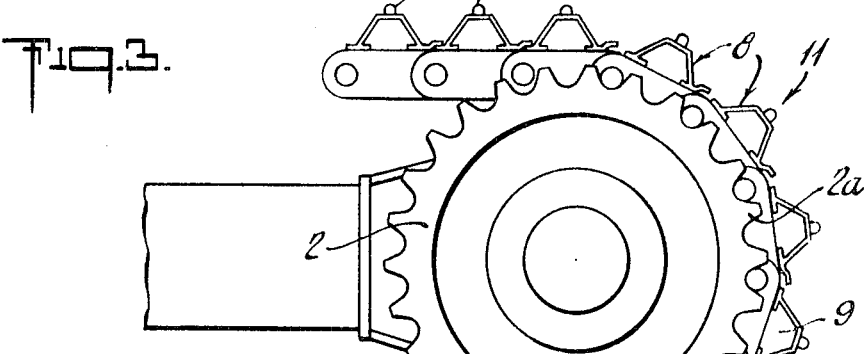
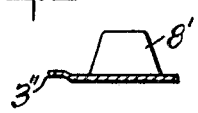
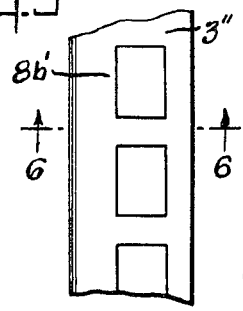
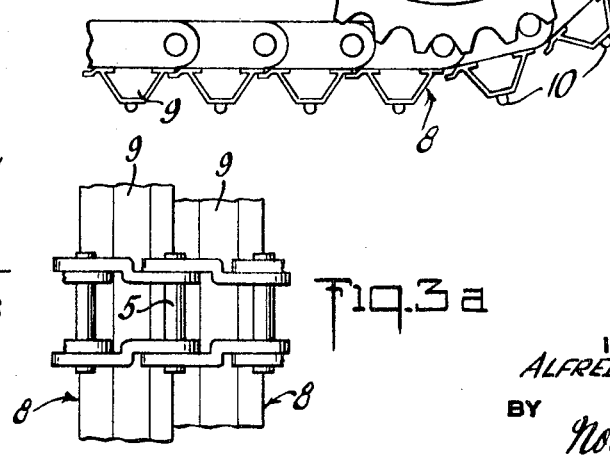
INVENTOR
ALFRED SCHMIDT, JR.
BY Nolte & Nolte
ATTORNEYS

ENDLESS-CHAIN TRACKS FOR VEHICLES, SUCH AS SNOW REMOVAL VEHICLES AND THE LIKE

The present invention relates to chain tracks for tractors or other vehicles, preferably for snow removing vehicles and vehicles required to be driven on snow.

The chain tracks of heavy-duty construction machines such as, for example, bulldozers, scrapers, vehicles for snow removal, and the like, usually consist of articulated tracks having track shoes in the form of heavy steel plates linked one to the other and being provided with carrying members for engagement with the sprocket or chain wheels of the chain drive.

However, on active duty in snow, the above-mentioned machines encounter serious operational problems which are different from those occurring during the summer operation.

The difficulties of prior art chain tracks ocurring in the winter operation result from the fact that the snow which penetrates between the chain track members is not, by contrast to the adherent solid dirt, loosened and driven off by the motion of the chain wheels, but it is firmly compressed and subsequently freezes on respective chain members. At the same time, the snow continues accumulating mostly on such places where, during the movement of the chain track, void space occurs between the driving chain wheel and the linking means of the chain track. Due to the movement of the sprocket wheel, the snow is compressed on such places into a solid accumulation or lump and does not detach itself from the chain members. Consequently, the snow lumps accumulate and grow on the inner side of the chain track and, in the course of time, completely solidify into icy pieces which, as mentioned above, correspond in their shape to the vacant areas resulting between the driving wheel and the chain shoes. Under certain conditions of the snow and at certain temperatures, the aforementioned snow or ice lumps may build up very quickly. Since, after the formation of the icy lumps, the snow penetrating between the chain members can no longer be compressed, extremely large tension will result between respective chain links. Spring elements which are sometimes provided in the chain track drives are unable to neutralize this tension or they are effective only partially, that is, to the extent of the maximum spring tension or pitch. As a consequence, ruptures in the junction points of respective chain members are very frequent in prior art chain tracks.

Attempts have been already made to remove the snow and ice lumps from the chains by the employment of mechanical scraping devices. The latter device, however, appeared to be ineffective for the efficient removal of the harmful lumps.

A primary object of the present invention is, therefore, to solve the above-discussed problems of prior art chain tracks. More particularly, it is an object of this invention to provide a chain track which has an increased durability and insures a trouble-free operation in snow.

Another object of the present invention is to make a chain track having a substantially improved power transfer and adhesion relative to the ground.

According to this invention, the above objects are attained by providing each chain member of a chain track with a hollow, outwardly projecting, rigid cleat member. The cleat member is integral with a flat chain plate having an opening in the region of the snow lump formation. The hollow cleat and the opening are filled with a resilient and smooth-surfaced material, such as rubber or plastics, for preventing the adhesion of snow lumps on the inner surface of the chain tracks.

To make the invention more clearly understood, reference will now be made to the accompanying drawing which illustrates by way of an example an embodiment of this invention and in which:

FIG. 1 is a schematical cross-sectional side view of a portion of a conventional chain track with firmly adherent ice lumps thereupon;

FIG. 2 shows on a larger scale one prior art chain link of FIG. 1;

FIG. 3 is a schematical cross-sectional side view of a portion of a chain track according to this invention;

FIG. 3a illustrates in a bottom view the chain links actually connecting the chain plates;

FIG. 4 is a vertical cross section through a single chain link tread or plate of FIG. 3, on a larger scale;

FIG. 5 is a similar view of a modified chain track; and

FIG. 6 is a sectional view taken along lines 6—6 in FIG. 5

FIG. 1 illustrates an arrangement of prior art chain tracks. The shown example of the conventional chain track 1 consists of a plurality of jointed chain members in the form of solid treads or chain plates 3. A vertical cross section of a single chain plate member of FIG. 1 is shown on a larger scale in FIG. 2. Each chain member is, in a known manner, jointed at opposite ends thereof to adjacent chain members by means of linking pieces 5 which are mounted in inwardly directed holding members 5a (shown, for simplicity, only along the upper and lower runs). The linking pieces 5—5a thus engage with sprockets 2a of the driving sprocket wheel 2. In order that the chain tracks might better engage with the ground, respective chain plates 3 are provided with outwardly projecting cleats 3a. It is evident from FIG. 1, that the snow penetrating into the void space between the sprockets 2a is compressed by the inner surface of chain plates 3 which come in mesh with the sprocket wheel 2. The compressed snow subsequently freezes and forms icy lumps 6 which firmly adhere to inner surface portions of respective chain members. Besides, the lump formation of the snow may occur also in the intermediate space 7a between linking pieces 5, 5a and the contact area of two linked chain plates 3. Since the compressed snow cannot fall off, there will follow an increased tension in the area of the aforementioned space, namely between respective chain members and linking pieces on the one hand, and the chain track itself and the driving sprocket wheels on the other hand. As previously mentioned, such tension may cause a breakdown of the chain track or damage to the driving sprocket wheels 2.

Such a possibility is eliminated by the application of the chain track of this invention, as shown schematically in FIGS. 3 and 4.

With reference to the detailed sectional view of one chain track plate 3' in FIG. 4, the novel plate comprises flat base portions 8a and 8c, defining a plate similar in length and width to the plates 3 of FIGS. 1 and 2 and of the same material, but provided with an opening 8b facing toward the spaces between the sprockets 2a in which the snow lumps tend to accumulate. The opening 8b communicates with the interior of the outwardly bulged hollow cleat 8, which is preferably of frustoconical or trapezoidal cross section and which can be of metal plate having similar thickness as chain plate 3', and integral therewith as shown. The space within the cleat 8 and its opening 8b is filled, to a plane level with the inwardly facing surfaces of the portions 8a and 8c, with a material 9 to the surface of which snow will not adhere. Such material may be, for example, rubber, certain plastics and other elastomeric substances. The linking pieces 5 and holding members 5a (shown as in FIG. 1) can be either directly or indirectly articulated one to the other, i.e., they can be either integral parts of the chain links 3 or made separately.

The filling 9 can be secured within the bulged cleats 8 by various means, such as, for instance, by way of pressing, cementing, vulcanizing, screwing (by retaining screws, not shown), etc., the filling material into said bulged cleats as shown in FIG. 4, filling 9 is also anchored in cleat 8 by inwardly projecting edge portions of chain plate 8a, 8c. The shape of the bulged cleats 8 can be also of a triangular cross section or made along the entire width of the chain plate 8a or there may be provided a plurality of the frustoconical bulged portions on a single chain plate (FIGS. 5 and 6).

For increasing the power transfer to ground, the top of the bulged cleat 8 may be further provided with projecting pieces 10 which can be affixed thereto by welding, for example. As seen in FIGS. 3 and 4 the inwardly exposed rubber surface 8b in cleat 8 and plate 3', occupies a major part of the area of this plate. Therefore, and due to the adhesion-inhibiting and resilient properties of the filling 9, the snow compressed against the inner surface of the chain plate 8a, 8c, cannot firmly adhere thereto. During the travel of the chain track 11 the compressed snow falls off and no icy lumps can accumulate.

What is claimed is:

1. An endless chain track for traveling on snow in the operation of a vehicle, particularly a vehicle for snow removal, said track having chain members, each of which comprises:
   pairs of linking members, said members lying in mutually adjacent parallel planes and being interconnected to engage sprocket wheels of the vehicle;
   a plate secured to outer edges of such linking members, the plate being elongated to reach from one side of the vehicle toward the other side and being apertured over a major part of the surface of the plate;
   at least one similarly apertured cleat member tapering outwardly from that plate into the snow;
   and an elastically deformable filling in the cleat member, secured thereto and thereby to said plate, and widely exposed through said apertured surface, to inhibit adhesion of snow to said plate.

2. An endless-chain track member according to claim 1 wherein said hollow cleat member is integral with said chain plate.

3. An endless-chain track member according to claim 1 wherein said hollow cleat member is integral with said linking means.

4. An endless-chain track member according to claim 1 wherein said hollow cleat member has an outwardly tapering trapezoidal configuration.

5. An endless-chain track member according to claim 1 wherein said hollow cleat member has a width corresponding approximately to the width of said chain plate.

6. An endless-chain track member according to claim 1 wherein said chain plate has a plurality of openings therein and supports a corresponding plurality of hollow cleats having equal height.

7. An endless-chain track member according to claim 1 wherein said filling is of resilient material, such as rubber, plastic, or other elastomeric material.

8. An endless-chain track member according to claim 1 wherein the top portion of the cleat member is provided with an additional projecting piece for increasing the adhesion of the tracks to ground.

* * * * *